No. 739,814. Patented September 29, 1903.

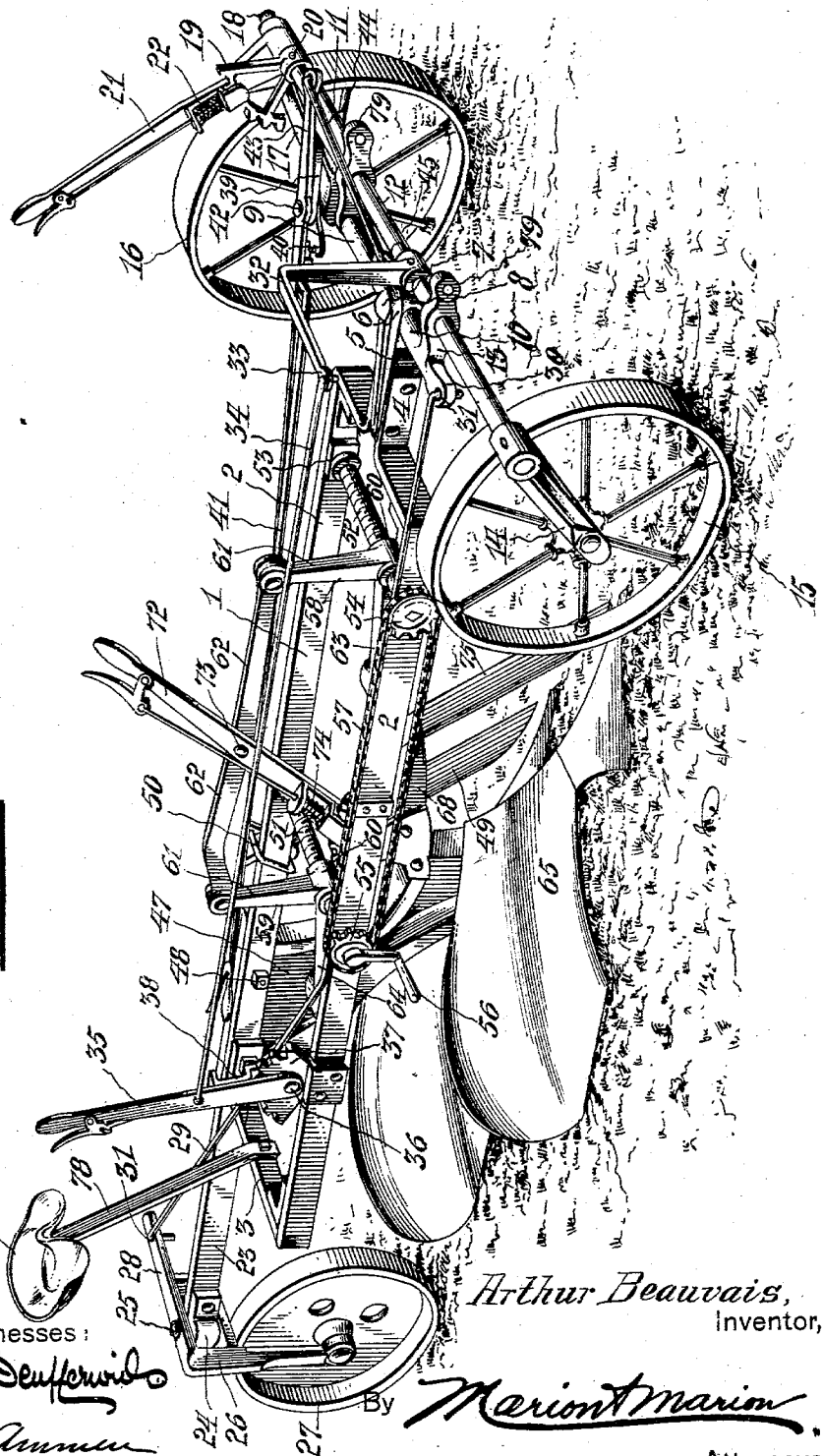

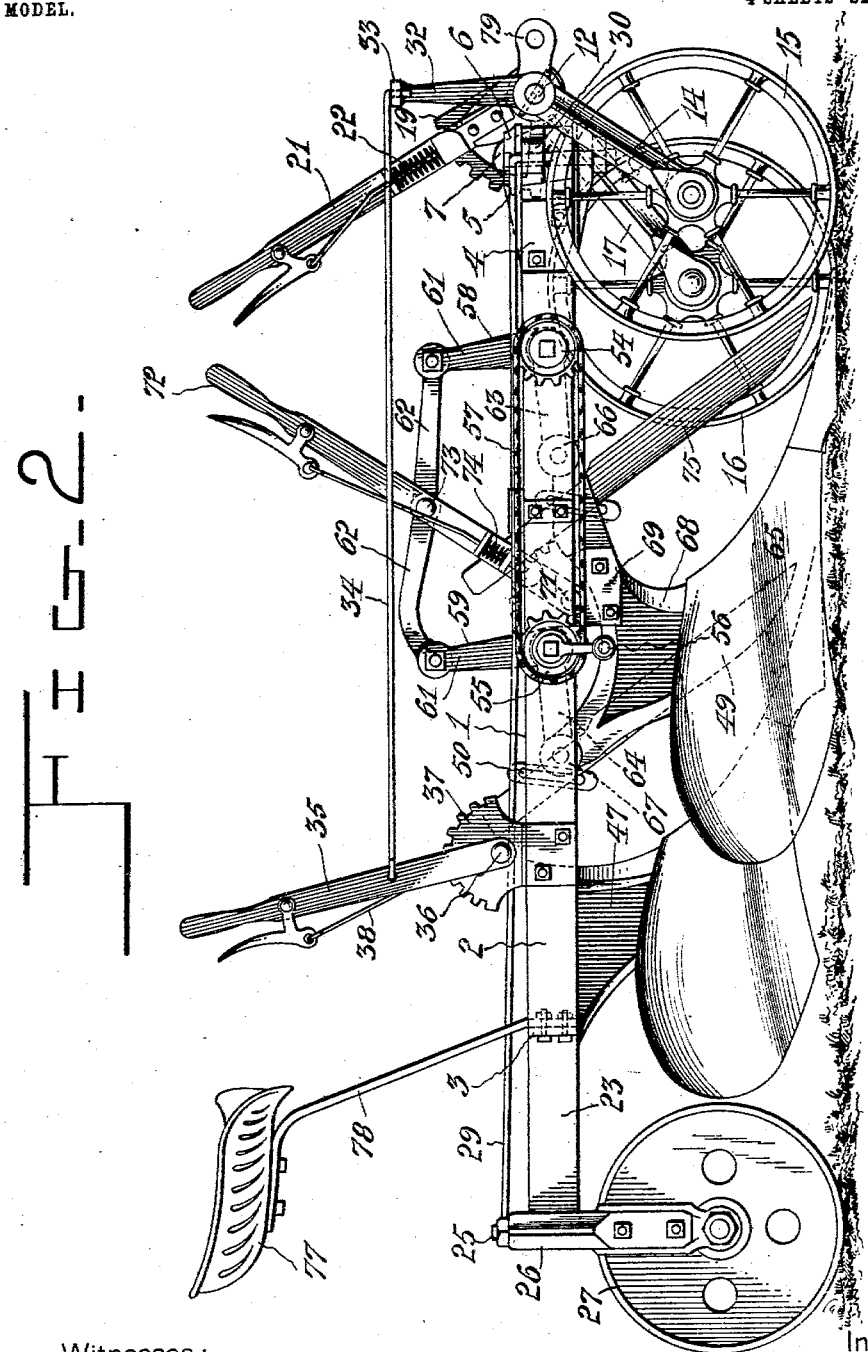

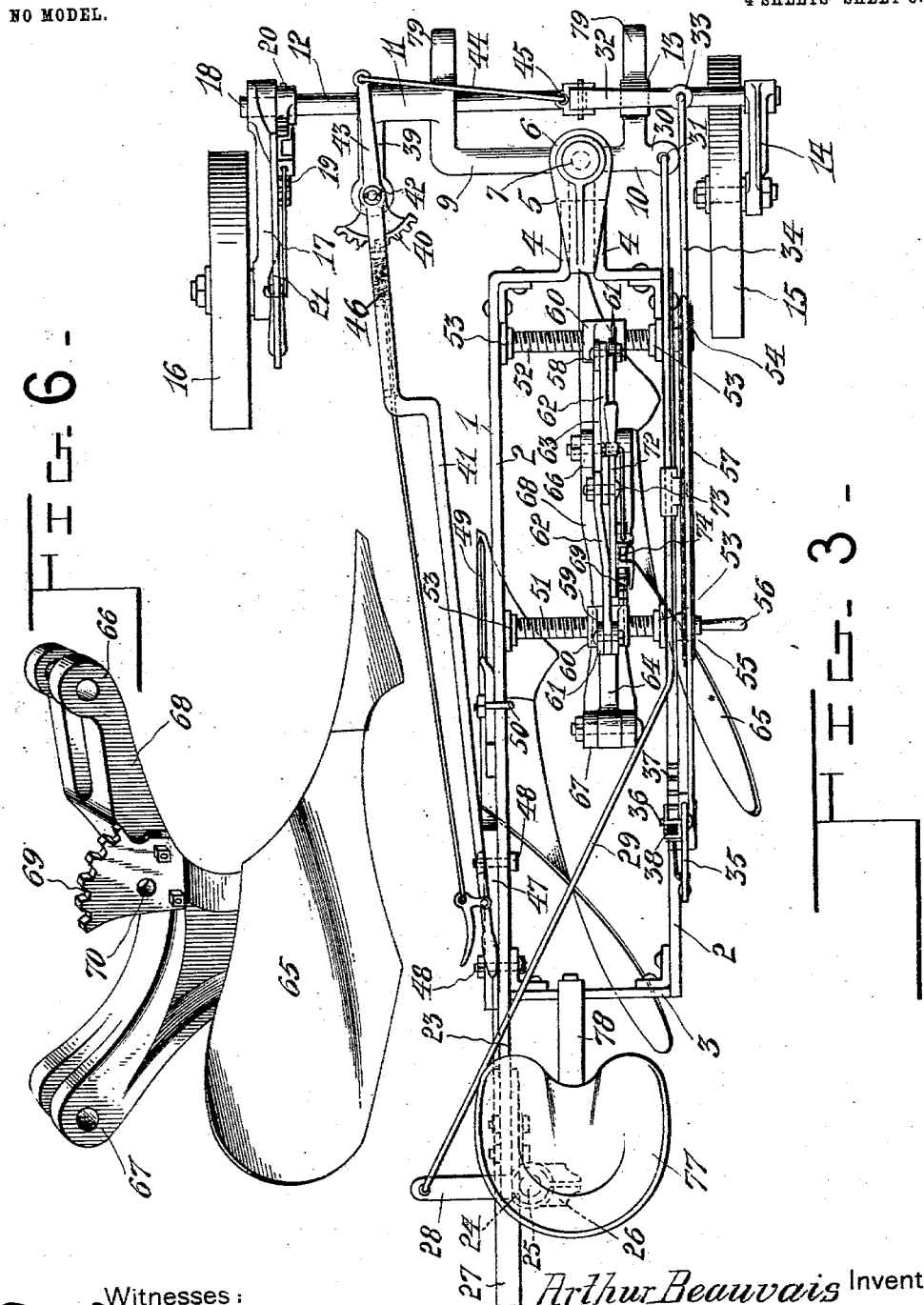

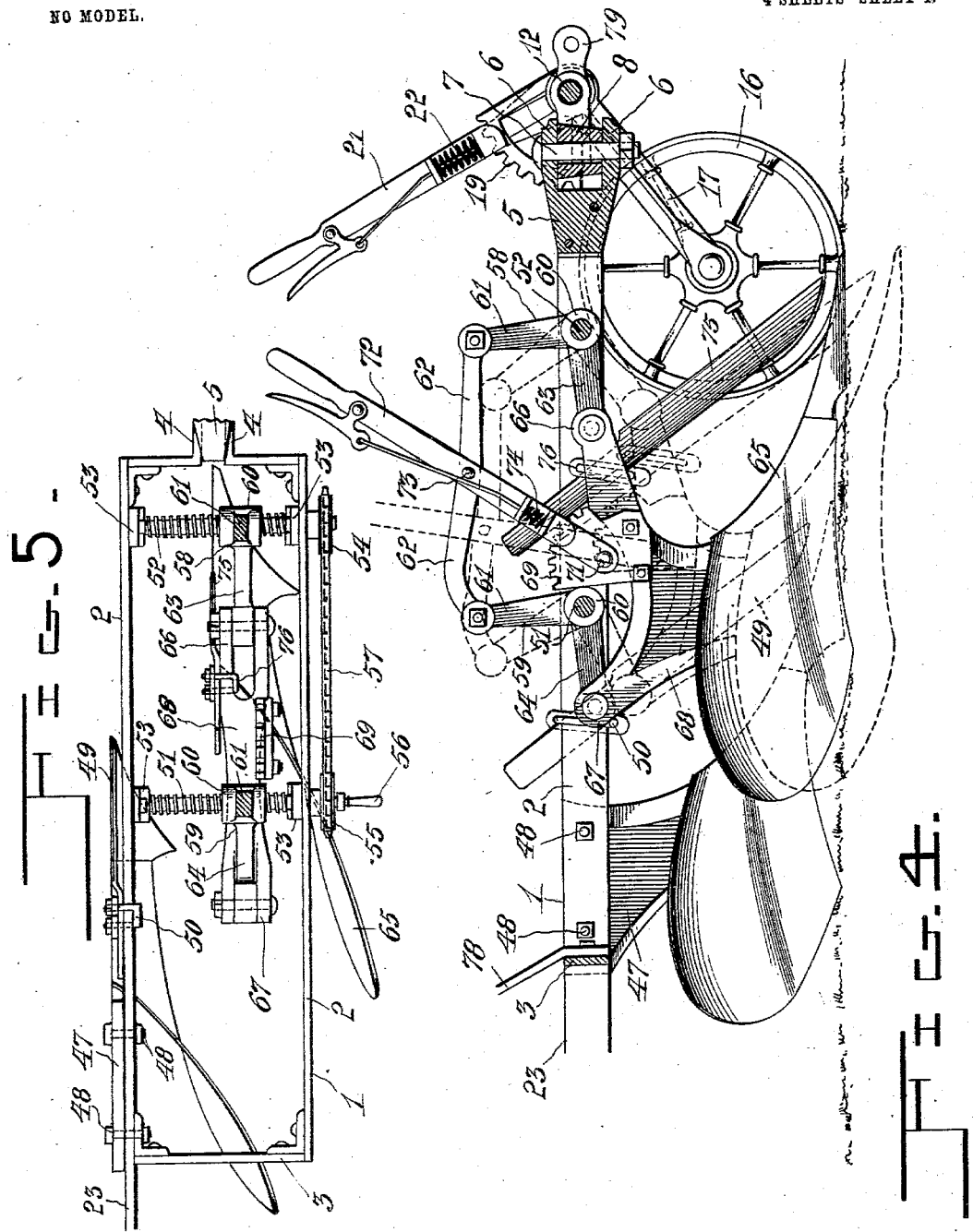

UNITED STATES PATENT OFFICE.

ARTHUR BEAUVAIS, OF LAPRAIRIE, CANADA.

PLOW.

SPECIFICATION forming part of Letters Patent No. 739,814, dated September 29, 1903.

Application filed April 22, 1903. Serial No. 153,770. (No model.)

*To all whom it may concern:*

Be it known that I, ARTHUR BEAUVAIS, a subject of the King of Great Britain, residing at Laprairie, county of Laprairie, Province of Quebec, Canada, have invented certain new and useful Improvements in Plows; and I do hereby declare that the following is a full, clear, and exact description of the invention, such as will enable others skilled in the art to which it appertains to make and use the same.

My invention relates to plows, and concerns itself especially with the construction of a sulky-plow, the object of the invention being to provide a plow of this kind having two plowshares, improved arrangements being made for effecting a lateral and vertical adjustment of the said shares with respect to each other.

In its general construction the invention comprises a frame or beam which supports the plowshares and which frame is itself supported on wheels. Transversely-disposed screws are carried by the said frame, and these screws afford means for supporting a system of levers, which levers support one of the plowshares and afford means for raising and lowering same by means of a hand-lever. The said screws also afford means for adjusting this plowshare laterally with respect to the frame.

The invention consists in the construction and combination of parts to be more fully described hereinafter and definitely set forth in the claims.

In the drawings, which fully illustrate my invention, Figure 1 represents the plow in perspective to which my invention has been applied. Fig. 2 represents this plow in side elevation. Fig. 3 represents the plow in plan. Fig. 4 is a longitudinal section of the forward portion of the plow upon a somewhat enlarged scale for the purpose of displaying those parts of the implement with which my invention is especially concerned. Fig. 5 is a substantially horizontal section illustrating especially the parts shown in Fig. 4. Fig. 6 is a perspective of an adjustable plowshare constituting a part of the invention.

Throughout the drawings and specification the same numerals of reference indicate like parts.

Referring more particularly to the parts, 1 represents the plow-beam, which, as shown, consists, substantially, of a rectangularly-formed frame having side members 2 and a tail-bar 3. At its forward portion this frame 1 is formed into two forwardly-projecting tongues 4, which attach thereto between them a head 5. It should appear that this head is formed with forwardly-projecting wings 6, through which pass a king-bolt 7, which king-bolt affords means for holding in place the knuckle 8. This knuckle is provided with oppositely-disposed arms 9 and 10, the former of which is preferably of somewhat greater length than the latter and which terminates in a hub 11, which constitutes a bearing for the transversely-disposed axle 12 in the manner shown. Arm 10 is provided with an extension 13, which constitutes a second bearing for this axle 12. The right-hand extremity of the axle 12 has rigidly attached thereto an arm 14, which arm carries at its extremity the furrow-wheel 15. The land-wheel 16 is carried upon the arm 17, which arm is loosely mounted upon the extremity 18 of the aforesaid axle 12 in the manner shown. Arrangement is made for adjusting said arms 14 and 17 with respect to each other. For this purpose adjacent to the arm 17 there is provided a segment 19, which is rigidly attached, by means of a pin 20, to the aforesaid axle 12. This segment coöperates with a hand-lever 21, which hand-lever is rigid with aforesaid arm 17 and provided with locking mechanism 22, coöperating with the teeth of the segment 19. From this arrangement the arm 17 and hub may turn into any desired position with respect to the arm 14 within certain limits and locked there, as will be readily understood. It will of course be understood that this arrangement just described is for the purpose of changing the relative elevation of the land-wheel and the furrow-wheel, which change is evidently necessary on account of the depth of the furrow.

The left side member 2 of the frame comprises a rearward extension 23, which terminates in a head 24, in which head is mounted a pivot-bolt 25, and this pivot-bolt affords means for attaching a bracket 26, which carries a trailer-wheel 27 in the manner indicated, said bracket having a laterally-projecting arm 28. It will appear that this arm 28 is connected, by means of a bent link 29, with a lug 30, which constitutes the extremity of the aforesaid knuckle-arm 10. It should be said that this link is freely mounted in the openings 31 provided to receive it, and evidently it affords means for transmitting a movement between the bracket 26 and the knuckle 8 in the usual manner.

Arrangement is made for controlling the angular position of the axle 12 aforesaid for the purpose of effecting a movement of the wheel-arms 14 and 17. To this end, substantially near its middle point, the said axle is provided with an offset lever 32, to the extremity 33 of which there is attached a link 34, the rear extremity of which link is attached to a hand-lever 35, and this hand-lever is pivotally mounted at 36 upon a segment 37, fixed to the right-hand side 2. Evidently from this arrangement a movement of the lever 35 may adjust the arms 14 and 17 simultaneously to the same angle, so as to raise or lower the frame 1. Locking mechanism 38 is provided in connection with the hand-lever 35, which coöperates with the teeth of the aforesaid segment 37 in the usual manner.

It should be understood that the aforesaid axle 12 is free to move longitudinally in its bearings 11 and 13. Arrangement is made for moving it in the manner suggested and for locking it in various positions. For this purpose the aforesaid bearing 11 is provided with a rearwardly-projecting arm 39, to which are attached the segment 40 and lever 41, which lever is pivoted, as shown at 42, and comprises a forwardly-projecting arm 43, to the extremity of which there is attached a link 44, and this link connects, by means of the yoke 45, to the side of the aforesaid lever 32. From this arrangement evidently by moving the lever 41 the axle 12 may be moved longitudinally in its bearings. It may be locked in different positions by means of the locking mechanism 46, which coöperates with the teeth of the aforesaid segment 40.

To the left-hand member 2 of the plow-frame there is affixed a plowshare 47, the same being attached by means of the bolts 48, and forwardly of this point there is provided a colter 49, which is attached to the frame by means of the usual yoke 50.

I shall now describe the mechanism of the implement in which my invention especially resides. This mechanism comprises a pair of horizontally-disposed screws 51 and 52, which are arranged transversely of the frame, their extremities being supported in aforesaid side members 2 in the manner indicated by means of bearing-blocks 53. Their projecting extremities carry rigidly the sprocket-wheels 54 and 55, the latter of which is provided with a crank 56, whereby motion may be transmitted to the sprocket-wheel 54 through the medium of a sprocket-chain 57, which connects them in the manner indicated. It is of course understood that the two screws 51 and 52 are of the same pitch and the sprocket-wheels 54 and 55 of equal diameter. The purpose of this arrangement will appear hereinafter. Upon the set-screws 51 and 52 there are mounted, respectively, the bell-crank levers 58 and 59, the hubs 60 of which are internally threaded, whereby the rotation of the screws will effect the lateral adjustment of the levers, as will be readily understood. These levers have substantially vertical opposite arms 61, which are connected by a link or bar 62 in the manner shown, and they also have substantially horizontal arms 63 and 64, respectively, and these latter arms are adapted to support the movable plowshare 65. The construction of this plowshare is most clearly shown in Fig. 6, where it should appear that its sheath 68 is formed into bifurcated necks 66 and 67, which necks are pivotally attached to the aforesaid arms 63 and 64, respectively. To the sheath 68 there is attached a segment 69, and this segment is provided with an opening 70, which receives the pivot-pin 71 and the controlling-lever 72, which controlling-lever is pivotally connected at 73 with the aforesaid link or bar 62. Locking mechanism 74 is provided in connection with this lever and coöperating with the teeth of the aforesaid segment 69, affording means for locking the lever 72 in a plurality of positions, as will be readily understood.

From the arrangement just described it should appear that by changing the position of the lever 72 the crank-levers 58 and 59 will be moved so as to raise or lower the plowshare 65. In Fig. 4 the parts are shown in dotted outline in a second possible position.

The colter or knife 75, which is substantially similar to the aforesaid colter 49, is provided in connection with the share 65, the same being attached to the sheath in the manner indicated by means of a yoke 76.

A seat 77 is provided which is mounted upon a seat-post 78, attached to the tail-bar 3 aforesaid, and it should appear that aforesaid bosses or bearings 11 and 13 have forwardly-projecting ears 79, which facilitate the attachment of the draft mechanism, so that horses may draw the plow.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. In a plow, in combination, a frame, a transversely-disposed screw carried by said frame, a lever having a threaded hub through which said screw passes, a plowshare supported by said lever and means for rotating said screw to adjust said lever laterally with respect to said frame.

2. In a plow, in combination, a frame, a pair of substantially horizontal screws carried upon said frame and disposed transversely thereof, a pair of bell-crank levers having threaded hubs which receive said screws, a link connecting said levers in a plurality of positions and means for rotating said screws to adjust said levers laterally with respect to said frame.

3. In a plow, in combination, a frame, a lever supported thereby and adapted to rotate in a substantially vertical plane, a plowshare supported by said lever, a hand-lever carried by said plowshare, a link connecting said hand-lever with said first lever, and means for locking said hand-lever with respect to said plow.

4. In a plow, in combination, a frame, a pair of transversely-disposed bars, a pair of levers carried on said bars, a plowshare supported by said levers, a controlling-lever attached to said plowshare, and a link connecting said controlling-lever with said first lever.

5. In a plow, in combination, a pair of horizontally-disposed members, a pair of bell-crank levers carried thereby, a plowshare supported by said bell-crank levers, a link connecting said bell-crank levers, a hand-lever connecting with said link and attached to said plowshare, and means for locking said hand-lever rigidly to said plowshare.

6. In a plow, in combination, a frame, a pair of transversely-disposed members carried by said frame, a pair of bell-crank levers carried by said members, a plowshare supported by said bell-crank levers, a link connecting said bell-crank levers, a segment attached to said plowshare, a hand-lever carried by said plowshare and attached to said link, locking mechanism coöperating with said segment and means for adjusting said bell-crank levers laterally with respect to said frame.

7. In a plow, in combination, a frame, a pair of transversely-disposed screws supported by said frame, bell-crank levers having threaded hubs carried by said screws, links connecting said bell-crank levers, a plowshare supported by said bell-crank levers, a segment rigidly mounted upon said plowshare, and a hand-lever coöperating therewith and carried by said plowshare, said lever being connected with said link.

8. In a plow, in combination, a frame, a pair of transversely-disposed threaded members carried by said frame, levers having threaded hubs carried by said threaded members, a plow supported by said levers, and means for rotating said threaded members to adjust said plow laterally.

9. In a plow, in combination, a frame, a pair of transversely-disposed members, a plowshare supported thereby, means for raising and lowering said plowshare said members having threaded portions adapted to effect a lateral adjustment of said plowshare when rotated, and means for simultaneously rotating said members.

10. In a plow, in combination, a frame, a pair of transversely-disposed threaded members, levers supported upon said members, a plowshare carried by said levers, means for raising and lowering said plowshare, sprocket-wheels carried by the extremities of said members and a chain connecting said sprocket-wheels.

In witness whereof I have hereunto set my hand in the presence of two witnesses.

ARTHUR BEAUVAIS.

Witnesses:
J. A. MARION,
T. MYNARD.